(12) United States Patent
St. Germain et al.

(10) Patent No.: US 7,813,706 B2
(45) Date of Patent: Oct. 12, 2010

(54) IMPEDANCE MATCHED LANE REVERSAL SWITCHING SYSTEM

(75) Inventors: Michael C. St. Germain, Medford, MA (US); Kimo Y. F. Tam, Lincoln, MA (US)

(73) Assignee: Analog Devices, Inc., Norwood, MA (US)

( * ) Notice: Subject to any disclaimer, the term of this patent is extended or adjusted under 35 U.S.C. 154(b) by 989 days.

(21) Appl. No.: 11/346,003

(22) Filed: Feb. 2, 2006

(65) Prior Publication Data

US 2007/0178849 A1 Aug. 2, 2007

Related U.S. Application Data

(60) Provisional application No. 60/649,869, filed on Feb. 3, 2005.

(51) Int. Cl.
*H04B 1/44* (2006.01)
(52) U.S. Cl. .............................. 455/83; 455/78; 455/82; 333/101; 333/32
(58) Field of Classification Search ................... 455/83, 455/78; 370/229, 390, 395.4, 417, 422; 379/90.01; 375/224, 254; 333/101, 32
See application file for complete search history.

(56) References Cited

U.S. PATENT DOCUMENTS

| | | | | |
|---|---|---|---|---|
| 5,559,967 | A * | 9/1996 | Oprescu et al. | 710/105 |
| 6,738,858 | B1 * | 5/2004 | Fernald et al. | 710/317 |
| 6,965,302 | B2 * | 11/2005 | Mollenkopf et al. | 370/475 |
| 7,079,485 | B1 * | 7/2006 | Lau et al. | 370/229 |
| 2002/0085578 | A1 * | 7/2002 | Dell et al. | 370/422 |
| 2003/0197528 | A1 * | 10/2003 | Shibata et al. | 326/86 |
| 2004/0117537 | A1 * | 6/2004 | Marcel Vandensande | 710/305 |
| 2005/0123027 | A1 * | 6/2005 | Cioffi et al. | 375/222 |
| 2005/0265526 | A1 * | 12/2005 | Saeki | 379/90.01 |

\* cited by examiner

*Primary Examiner*—Edward Urban
*Assistant Examiner*—Ganiyu Hanidu
(74) *Attorney, Agent, or Firm*—Goodwin Procter LLP

(57) ABSTRACT

An impedance matched lane reversal switching system including first and second transceiver pairs, each of the pairs including a transmitter connected to a receiver, the output of the transmitter connected to the input of the receiver and to a node, the node of each pair interconnected with a transmission line and a switching circuit for selectively enabling one of the transmitters of one of the transceiver pairs and disabling the other and selectively utilizing one of the receivers of the other of the transceiver pairs and not the other to selectively reverse an egress side and an ingress side of the lane.

18 Claims, 7 Drawing Sheets

IMPEDANCE MATCHED LANE REVERSAL SWITCHING SYSTEM

RELATED APPLICATIONS

This application claims the benefit of U.S. Provisional Application No. 60/649,869 filed Feb. 3, 2005, incorporated by reference herein.

FIELD OF THE INVENTION

This invention relates generally to a switching system and more particularly to an impedance matched lane reversal switching system that reverses the ingress and egress sides of the lane to provide connectivity to different types of devices.

BACKGROUND OF THE INVENTION

In high speed switching of digital signals a switching system, typically part of a switch card, is connected to a backplane. Multiple line cards that each include a plurality of Ethernet connection ports are also connected to the backplane. The Ethernet ports provide connectivity to a vast array of digital devices, e.g., computers, printers, and the like, on a typical computer network. The switching system provides high speed switching of the digital signals to and from the digital devices connected to the line cards.

A typical conventional switching system includes, inter alia, a transmitter and a receiver on an IC that are connected to the backplane. The line card, or other similar device, similarly includes a transmitter and receiver connected to a backplane.

A lane includes two logical connections. It includes both the connection from the transmitter of the switching system on the switch card to the backplane and to the receiver on the line card, and the connection from the transmitter on the line card to the backplane and to the receiver on the switching system on the switch card. A single lane allows transmitting data from the switch card to the line card and transmitting data from the line card to the switch card simultaneously. These are commonly called the ingress (inbound) and egress (outbound) sides of the lane. Data is typically transmitted out to the line card on the egress side and data is received from the line card on the ingress side. Therefore, in order for the line card, or similar device, to function properly with the switch card, the egress side of the lane must match the receiver on the line card, or similar device, and the ingress side of the lane must match the transmitter on the line card. Hence, if the receiver and transmitter of the line card do not match the appropriate egress and ingress sides of the lane the devices may still function properly but communication will fail.

Typical prior art lane reversal switching systems that attempt to overcome this problem utilize two ICs that each includes a transmitter and a receiver. The designs utilize one transmitter/receiver pair on one chip connected to the egress and ingress sides of the lane that match one type of device and utilize the other transmitter/receiver pair on the other chip that are connected to opposite sides of the lane to provide connectivity to another type of device that has the configuration of its transmitter and receiver reversed.

Because the transmitter and receiver on one of the two chips are connected to opposite sides of the lane from the transmitter and receiver on the other chip, two nodes exist at the connection point between the two sides of the lane.

In operation, the DC impedance seen looking into these nodes is less than expected, e.g., half the expected impedance. The result of the DC impedance mismatch is a reduced signal amplitude strength seen at the receiver.

Associated with each of the transmitters and receivers on the ICs and their terminating resistances are bond wires that are connected to package traces. Outside each IC or chip, card traces connect the package traces for the respective transmitters and receivers to a connector that connects to the backplane. At high frequency AC, e.g., 3.2 Gbits/sec, the transition time for a pulse is approximately 100 picoseconds, which approaches the travel time of the pulse through the package traces and card traces. At such high frequencies the card traces and package traces behave like transmission lines and have a characteristic impedance associated with them. Therefore, the high frequency AC impedance seen looking into the two nodes on the two sides of the lane is less than the expected high frequency AC impedance. The result of this high frequency AC impedance mismatch is reflections at two nodes. When the design includes a terminating resistance connected to each transmitter and each receiver of the transmitter/receiver pairs, then a reduced high frequency signal amplitude is received by the active receiver. If the design eliminates the terminating resistances connected to the receivers of the transmitter/receiver pairs on the ICs to provide DC impedance matching, then the high frequency impedance mismatch results in reflections not only at the nodes on the sides of the lane, but also at the receivers of the transmitter/receiver pairs on the ICs. These additional high frequency reflections at the receivers cause pulse edge distortion.

SUMMARY OF THE INVENTION

It is therefore an object of this invention to provide an impedance matched lane reversal switching system.

It is a further object of this invention to provide such a system which reduces high frequency reflections.

It is a further object of this invention to provide such a system which improves high frequency impedance matching.

It is a further object of this invention to provide such a system which reduces pulse edge distortion.

It is a further object of this invention to provide such a system which can be integrated on a single chip.

It is a further object of this invention to provide such a system which requires only a single terminating resistance for each transmitter and receiver pair.

This invention results from the realization that an impedance matched lane reversal switching system that provides connectivity to devices that have different orientation of their transmitters and receivers and provides both DC and high frequency AC impedance matching can be effected on a single chip by utilizing a pair of transceivers that each include a transmitter connected to a receiver wherein the output of the transmitter is connected to the input of the receiver and to a node and each node is connected to a transmission line, and a switching circuit that selectively enables one of the transmitters of one of the transceiver pairs and disables the other and utilizes one of the receivers of the other transceiver pair and not the other to selectively reverse the egress and ingress side of a lane so that devices that have opposite orientations of their transmitters and receivers can be utilized. This invention results from the further realization that utilizing a single chip and a single terminating resistance for each transmitter and receiver pair eliminates nodes on the lane and provides high frequency AC impedance matching and virtually eliminates reflections and pulse edge distortion.

The subject invention, however, in other embodiments, need not achieve all these objectives and the claims hereof should not be limited to structures or methods capable of achieving these objectives.

This invention features an impedance matched lane reversal switching system including first and second transceiver pairs, each of the pairs including a transmitter connected to a receiver, the output of the transmitter connected to the input of the receiver and to a node, the node of each pair interconnected with a transmission line, and a switching circuit for selectively enabling one of the transmitters of one of the transceiver pairs and disabling the other and selectively utilizing one of the receivers of the other of the transceiver pairs and not the other to selectively reverse an egress side and an ingress side of the lane.

In one embodiment, the system may include a set of terminating resistances interconnected to each node and to each transmission line for impedance matching and terminating both the transmitter and receiver of each of the transceiver pairs. The system may include a connection to at least two types of devices that have different orientation of their transmitters and receivers. The at least two types of devices may include line cards or switch cards. The system may be integrated on a single chip. The single chip may be disposed on a switch card. The single chip may be disposed on a line card. The switching circuit may include a plurality of switching devices for selectively enabling one of the transmitters of one of the transceiver pairs and utilizing one of the receivers of the other transceiver pairs in response to a control signal. The switching circuit may include an external control pin. The switching circuit may include a cross bar circuit having at least one input and at least one output for selectively connecting the at least one output to an enabled one of the transmitters of the transceiver pairs and the at least one input to a utilized one of the receivers of the other transceiver pair.

This invention also features an impedance matched lane reversal switching system including first and second transceiver pairs, each of the pairs including a transmitter connected to a receiver, the output of the transmitter connected to the input of the receiver and to a node, the node of each pair interconnected with a transmission line, and a switching circuit for selectively enabling one of the transmitters of the transceiver pairs and disabling the other in one mode to selectively reverse an egress side and an ingress side of the lane.

This invention also features a method of impedance matching and lane reversing a switching system including the steps of providing first and second transceiver pairs, each of the pairs including a transmitter connected to a receiver, the output of the transmitter connected to the input of the receiver and to a node, the node of each pair interconnected with a transmission line, and selectively enabling one of the transmitters of one of the transceiver pairs and disabling the other and selectively utilizing one of the receivers of the other of the transceiver pairs and not the other to selectively reverse an egress side and an ingress side of the lane.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
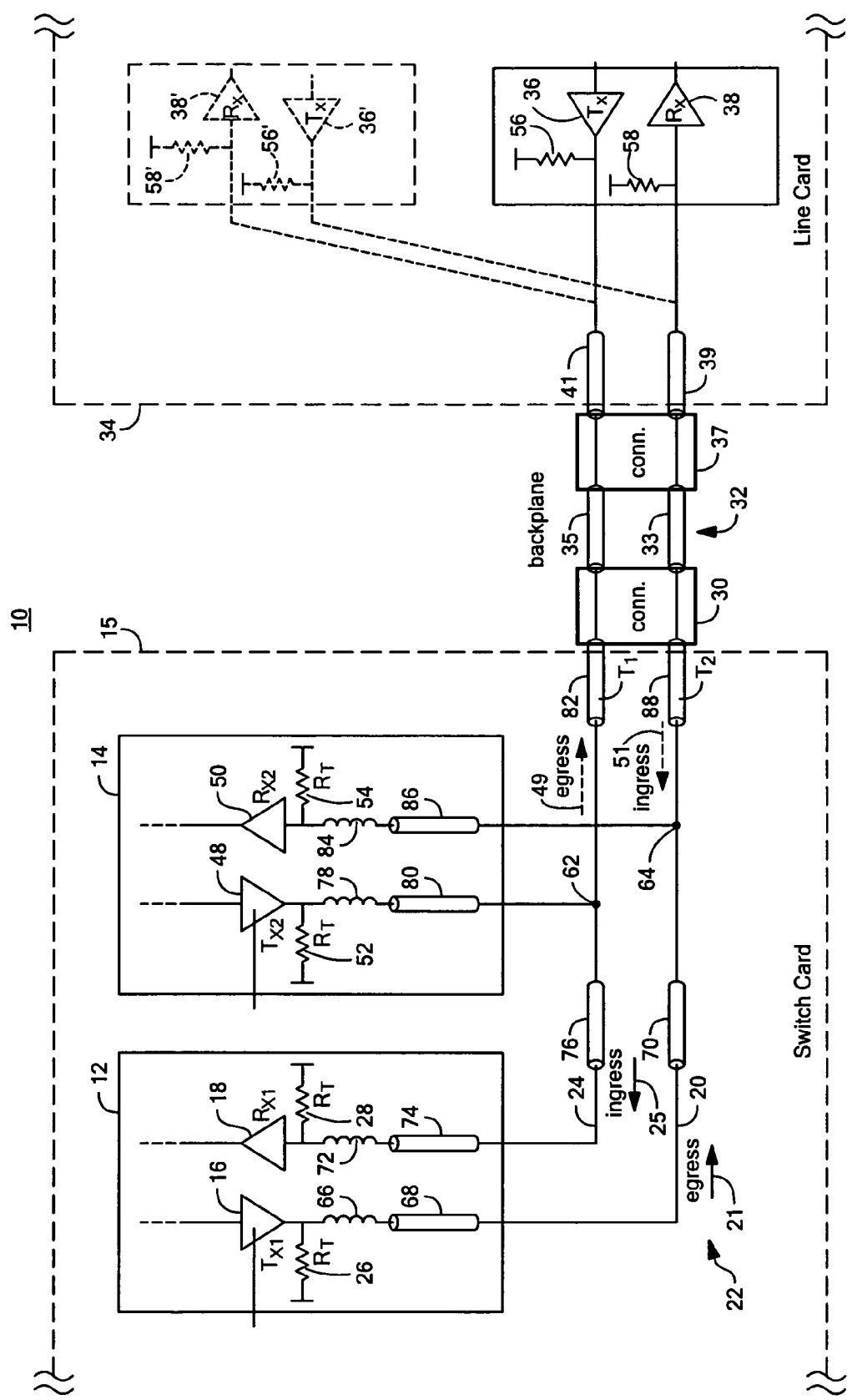
FIG. 1 is a schematic block diagram of a prior art lane reversal switching system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Conventional prior art lane reversal switching system 10, FIG. 1 includes IC 12 and IC 14 that are employed in typical switch card 15. IC 12 includes transmitter 16 with terminating resistance 26, bond wire 66 and package trace 68 connected to egress (outbound) side 20 of lane 22 and receiver 18 with terminating resistance 28, bond wire 72 and package trace 74 connected to ingress (inbound) side 24 of lane 22. Egress side 20 and ingress side 24 connect to backplane transmission lines 33 and 35 of backplane 32 via connector 30. Device 34, e.g., a line card, or similar device connects to backplane 32 via connector 37. In this example, device 34 includes receiver 38 with terminating resistance 58 and card trace 39 aligned with egress side 20 and transmitter 36 with terminating resistance 56 and card trace 41 aligned with ingress side 24.

In operation, data is transmitted by transmitter 16 on IC 12 to receiver 38 on device 34 via egress (outbound) side 20 of lane 22, indicated by arrow 21, and data is received by receiver 18 on IC 12 from transmitter 36 on device 34 via ingress (inbound) side 24 of lane 22, indicated by arrow 25. The line card (device 34) may also include an IC having receivers 38 and 38' and transmitters 36 and 36'. However, if the orientation of transmitter 36 and receiver 38 in device 34 is reversed, e.g., transmitter 36' is aligned with egress side 20 of lane 22 and receiver 38' is aligned with ingress side 24 of lane 22, communication to device 34 will fail. To accommodate for this situation, conventional system 10 includes IC 14 that includes transmitter 48 and receiver 50 which are connected to opposite sides of lane 22, e.g., transmitter 48 is connected to side 24 of lane 22 and receiver 50 is connected to side 20. Hence, side 24 of lane 22 now acts as the egress (outbound) side of lane 22, indicated by arrow 49 (shown in phantom) and data is transmitted from transmitter 48 on IC 14 to receiver 38'. Similarly, side 20 now acts the ingress (inbound) side of lane 22, indicated by arrow 51 (shown in phantom) and data transmitted by transmitter 36' is received by receiver 50 on IC 14. Hence, system 10 has reversed the ingress and egress sides of lane 22 to match the configuration of transmitter 36' and receiver 38' in device 34.

However, the connection between transmitter 48 on IC 14 to side 24 of lane 22 and the connection between receiver 50 to side 20 of lane 22 results in nodes 62 and 64, respectively. The result is that the DC impedance seen at nodes 62 and 64 is less than the desired impedance associated with the terminating resistance of the active transmitter. In this example, the impedance at node 64 is half the expected impedance of terminating resistance 26 when transmitter 16 is enabled due to terminating resistances 54 and 58 and the impedance at node 62 is half of the expected impedance of terminating resistance 56 when transmitter 36 is active due to terminating resistances 28 and 52. The result is a reduced DC signal amplitude being received at receiver 38 when transmitter 16 is active and at receiver 50 when transmitter 36 is active. The same mismatched impedance is seen at nodes 62 and 64 when transmitter 48 is active and transmitter 36' is active.

The high frequency AC impedance seen at node 64 will also be less than that expected when transmitter 16 is enabled due to the card trace 88 and package trace 86 behaving like transmission lines with a characteristic impedance. The high frequency impedance seen at node 62 is also less than expected when transmitter 36 is active and receiver 18 is used due to card trace 76 and package trace 80 behaving like transmission lines. The same high frequency impedance mismatch is found at node 62 when transmitter 48 is active and at node 64 when transmitter 36' is active and receiver 50 is used.

The high frequency impedance mismatch at node 64 results in the one third (⅓) of the signal on egress side 20 of lane 22 (when transmitter 16 is active) being reflected back to transmitter 16 where the signal ends due to terminating resistance 26. A fraction of the signal travels through node 64 to receiver 38 with terminating resistance 58 where the signal ends. The result is the signal received by receiver 38 has a reduced signal amplitude, e.g., two thirds (⅔) the expected value. Similarly, the signal received by receiver 18 when transmitter 36 is active will also be reduced.

Figure 2:
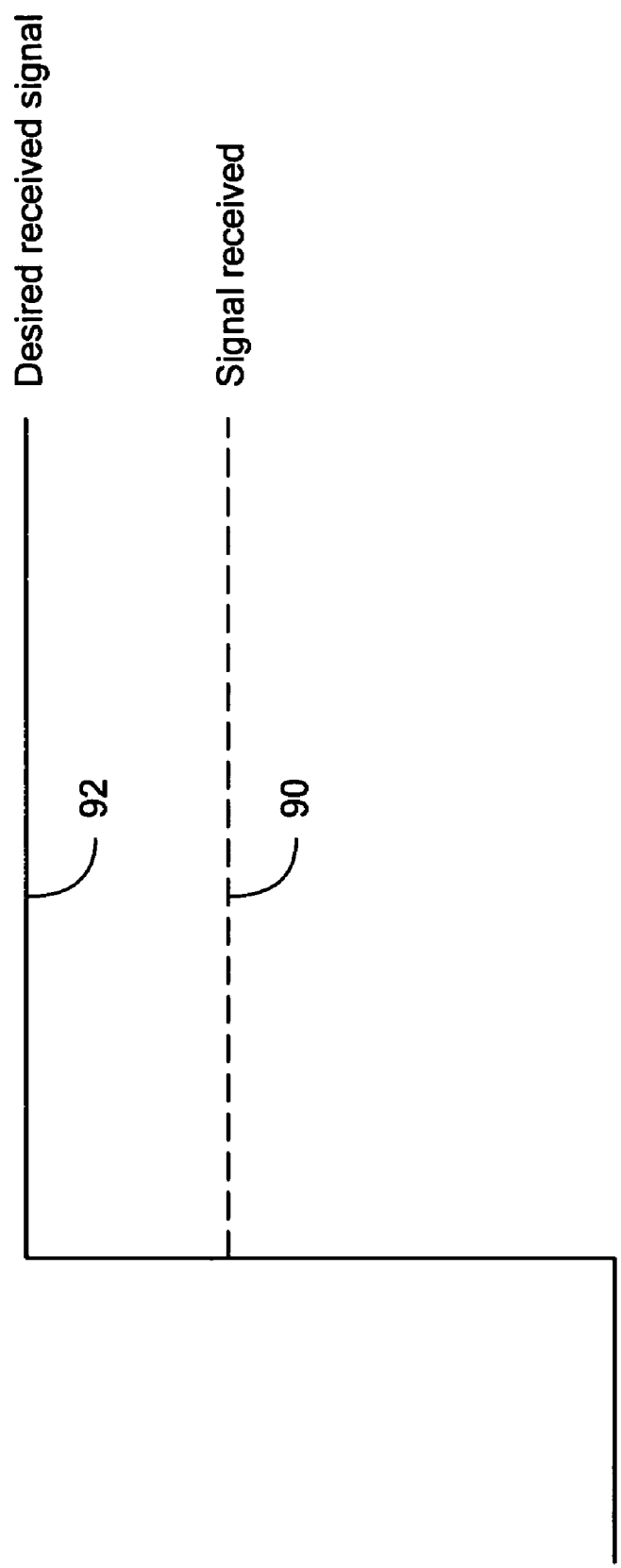
FIG. 2 is a graph showing a waveform with a reduced signal output generated by the lane reversal switching system shown in FIG. 1.

FIG. 2 shows an example of the signal 90 that has a reduced signal amplitude when compared to desired receiver signal 92 received by active receivers discussed above.

Figure 3:
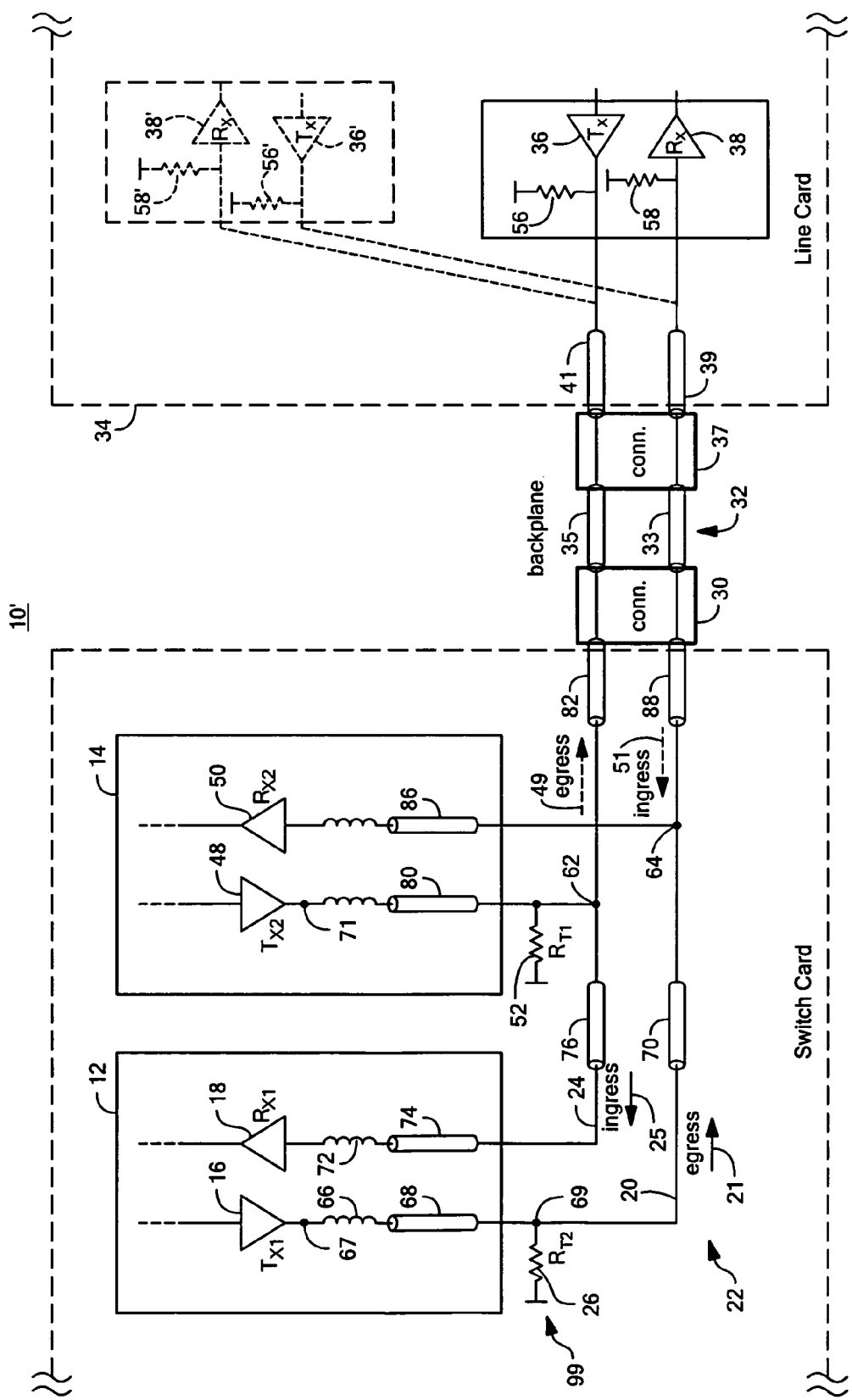
FIG. 3 is a schematic block diagram of another prior art lane reversal switching system.

Another conventional prior art lane reversal switching system 10', FIG. 3, where like parts have been given like numbers, utilizes a design similar to system 10 described above except terminating resistance 26 associated with transmitter 16 is located off IC 12 and terminating resistance 52 associated with transmitter 48 is located off IC 14. The design also removes the terminating resistances associated with receiver 18 on IC 12 and receiver 50 on IC 14.

One improvement to this design is that the DC impedance seen at nodes 62 and 64 matches the terminating resistance associated with active transmitter.

However, the high frequency AC impedance at nodes 62 and 64 remains mismatched due to the various card traces 70, 88, 76, and 82 and package traces 80 and 86 behaving like transmission lines with a characteristic impedance at the nodes. The high frequency AC impedance at node 62 is further decreased due to terminating resistance 52.

Similarly, the high frequency impedance mismatch at nodes 62 and 64 causes a portion of the signal to be reflected back to the active transmitter and a fraction of the signal to travel through the node. However, because there are no terminating resistances on receiver 18 on IC 12 and receiver 50 on IC 14, the fraction of the signal that travels through nodes 62 and 64 will be reflected back to the corresponding active transmitter. These reflections result in pulse edge distortion of the signal received by receiver 38.

Figure 4:
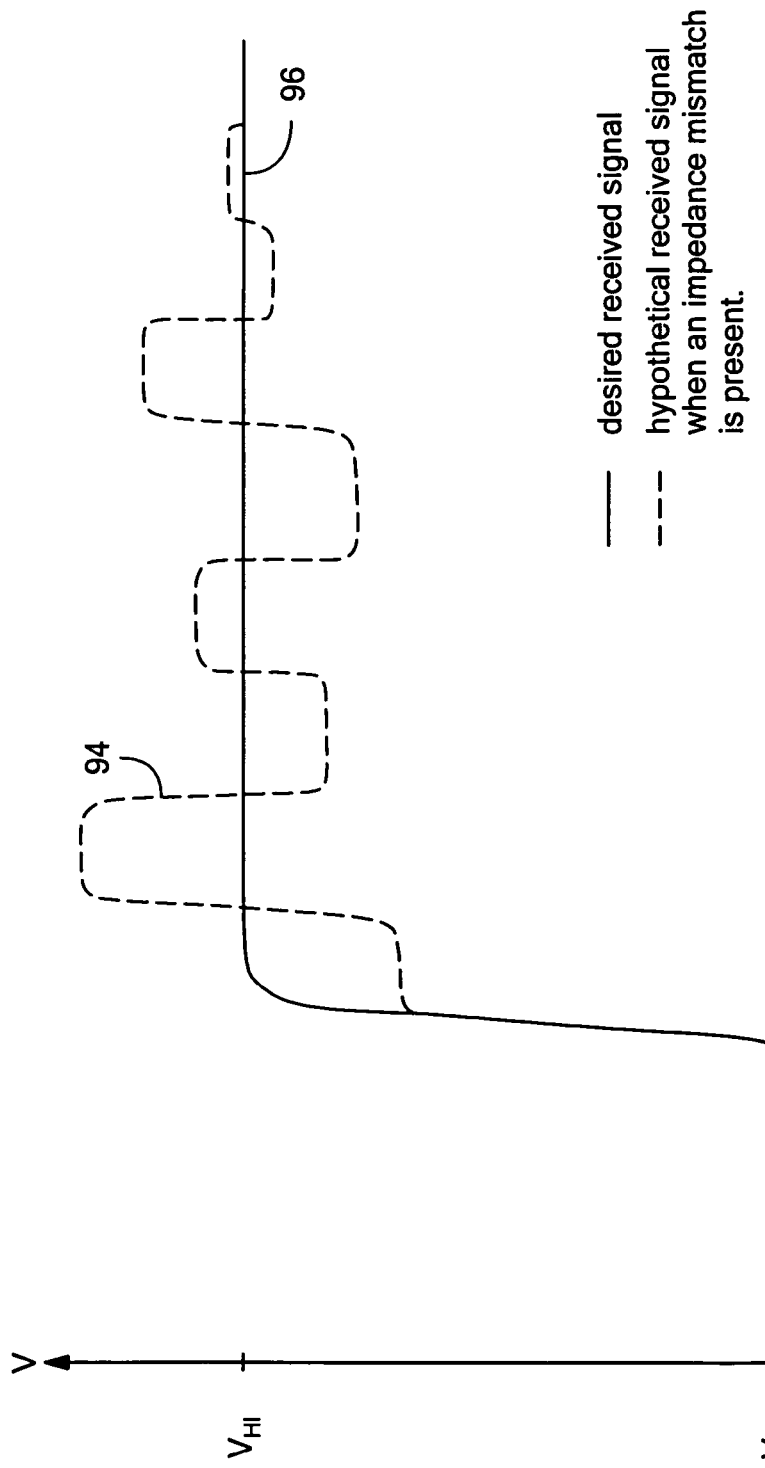
FIG. 4 is a graph showing a waveform with pulse edge distortion generated by the lane reversal switching system shown in FIG. 3.

Waveform 94, FIG. 4, shows an example of the pulse edge distortion that results from the high frequency impedance mismatch at nodes 62 and 64 discussed above. Waveform 96 shows an example of a desired signal that would be received by the active receiver.

Figure 5:
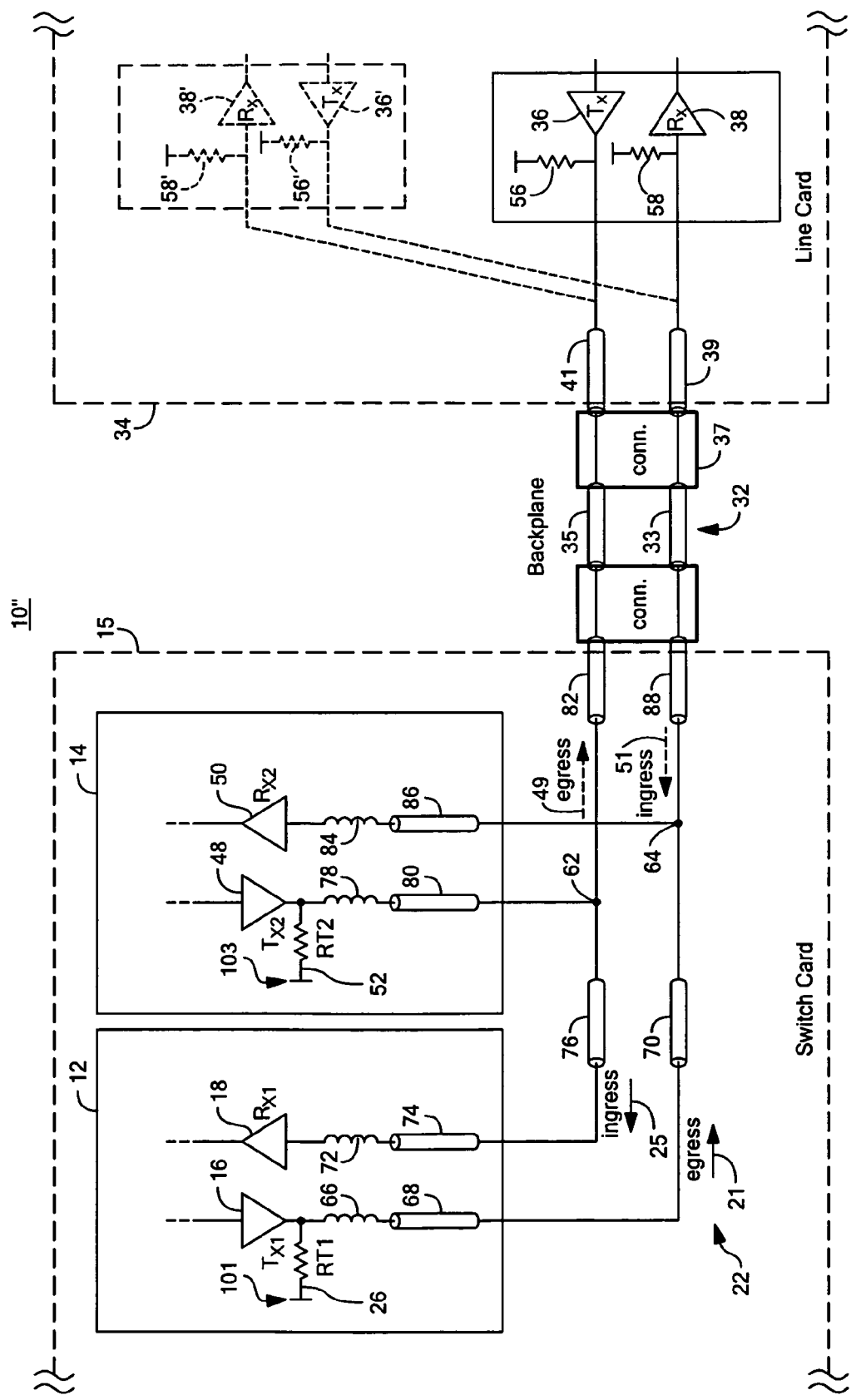
FIG. 5 is a schematic block diagram of yet another prior art lane reversal switching system.

Prior art lane reversal switching system 10", FIG. 5 where like parts have been given like numbers, similarly uses a single terminating resistance for each transmitter on IC 12 and IC 14. This design moves terminating resistance 26 that was previously located off IC 12, as shown by arrow 99, FIG. 3 to on IC 12 as shown by arrow 101, FIG. 5. Similarly, terminating resistance 52 is moved on IC 14, as shown by arrow 103. Although this design also improves DC impedance matching at nodes 62 and 64, the design also suffers from high frequency impedance mismatching at nodes 62 and 64 due to the various package traces and card traces that behave like transmission lines with a characteristic impedance. The design does remove three points of reflection at e.g., at nodes 67, 69, and 71, FIG. 3, because terminating resistances 26 and 52, FIG. 5, are moved on chip.

Figure 6:
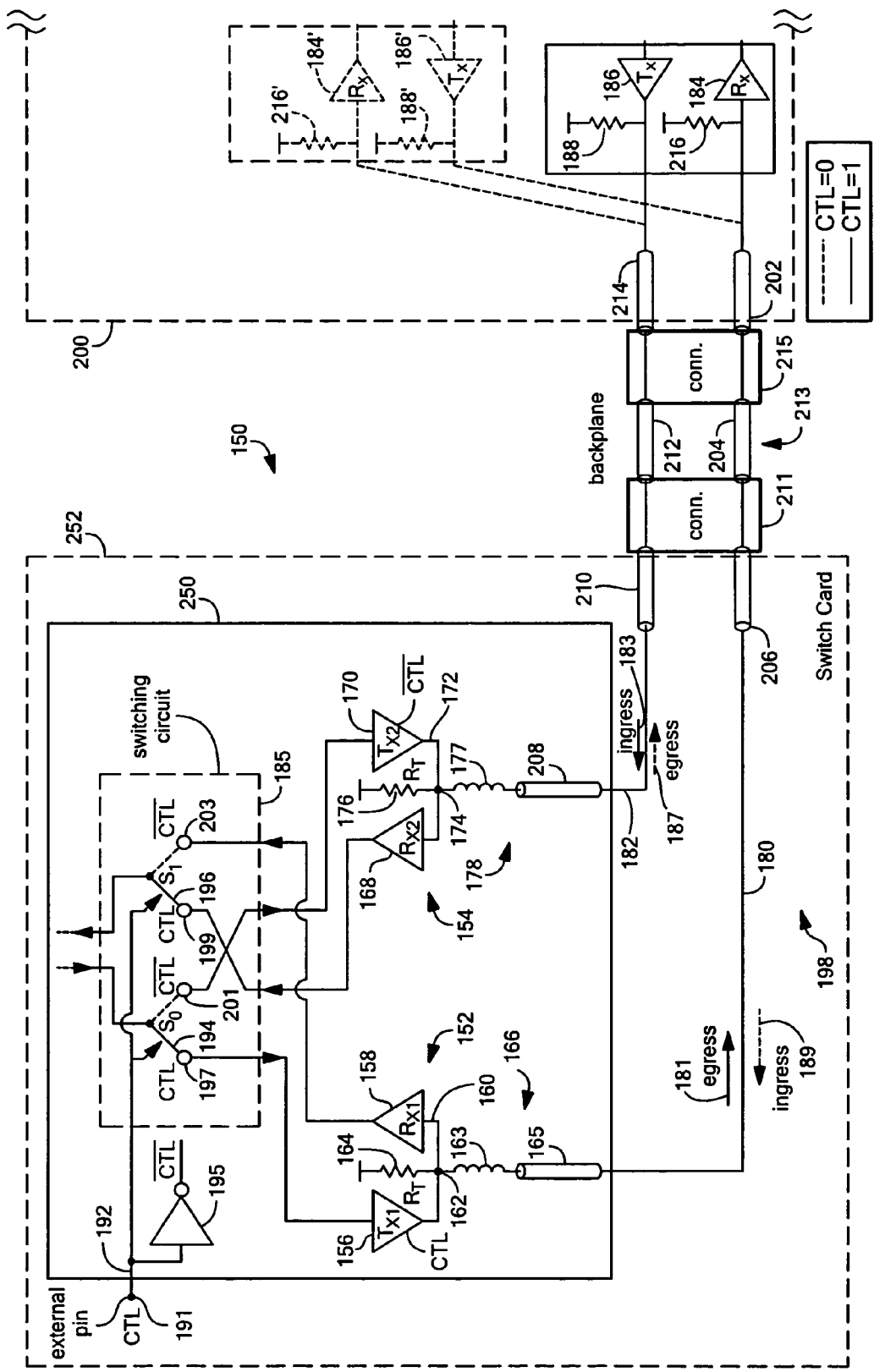
FIG. 6 is a schematic block diagram of one embodiment of the impedance matched lane reversal switching system of this invention.

In contrast, impedance matched lane reversal switching system 150, FIG. 6 of this invention, effectively reverses the ingress and egress sides of the lane to provide connectivity to a plurality of devices, e.g., line cards, switch cards, and the like, that have different configurations of their transmitters and receivers. System 150 also provides both DC and high frequency AC impedance matching by eliminating nodes on the sides of the lane and using a single terminating resistance connected to each transmitter and receiver pair. The result is that reflections are virtually eliminated and a full strength signal is received by the active receiver that is virtually free of pulse edge distortion.

Impedance matched lane reversal switching system 150 includes first transceiver pair 152 and second transceiver pair 154. Transceiver pair 152 includes transmitter 156 and receiver 158. The output of transmitter 156 connects to the input of receiver 158 by line 160 and to node 162. Terminating resistance 164 is attached to node 162. Node 162 connects to bond wire 163 that attaches to package trace 165. Package trace 165 interconnects to card trace 206. Transceiver pair 154 includes receiver 168 and transmitter 170. The output of transmitter 170 connects to the input of receiver 168 by line 172 and to node 174. Terminating resistance 176 is attached to node 174. Node 174 attaches to bond wire 177 that connects to package trace 208. Package trace 208 interconnects to card trace 210. Preferably, transceiver pairs 152 and 154 with terminating resistances 164 and 176, respectively, are on a single chip, e.g., chip 250 that is included on a typical switch card, e.g., switch card 252.

Card traces 206 and 210 affix to connector 211 that couple to backplane transmission lines 204 and 212 of backplane 213. Connector 215 interconnects backplane 213 to device 200, e.g., a line card, switch card, or similar device. Device 200 typically includes receiver 184 with terminating resistance 216 and transmitter 186 with terminating resistance 188 interconnected to connector 215 via package traces 202 and 214, respectively.

As described above, package traces 165 and 208, and card traces 206 and 210 on switch card 252, as well as package traces 202 and 214 on device 200 behave like transmission lines with a characteristic impedance (e.g., 50Ω) at high frequencies (e.g., 3.2 Gbits/sec) when the transition time of a pulse approaches the travel time of the pulse through the package traces and card traces.

Switching circuit 185 selectively enables one of transmitters 156 or 170 of transceiver pairs 152 and 154 and disables the other and utilizes one of receivers 158 or 168 of the opposite transceiver pairs 152 and 154 of the enabled transmitter 156 or 170 to selectively reverse sides 180 and 182 of lane 198.

For example, switching circuit 185 may selectively enable transmitter 156 of transceiver pair 152, disable transmitter 170 of transceiver pair 154, utilize receiver 168 of transceiver pair 154 and not utilize receiver 158 of transceiver pair 152 to provide connectivity to device 200 with receiver 184 and transmitter 186. In this example, data is transmitted by transmitter 156 of transceiver pair 152 on egress side 180 of lane 198, indicated by arrow 181, to receiver 184 on device 200. Data is transmitted by transmitter 186 on device 200 to receiver 168 of transceiver pair 154 on ingress side 182 of lane 198, indicated by arrow 183.

To provide connectivity to device 200, e.g., a line card, another switch card, or similar device with transmitter 186' and receiver 184', (shown in phantom) that are in opposite configuration as transmitter 186 and receiver 184, switching circuit 185 enables transmitter 170 of transceiver pair 154 and disables transmitter 156 of transceiver pair 152 and utilizes receiver 158 of transceiver pair 152 and does not utilize receiver 168 of transceiver pair 154. In this way, data will be transmitted by transmitter 170 of transceiver pair 154 on side 182 of lane 198, which now acts as the egress side of the lane, indicated by arrow 187 (shown in phantom) to receiver 184'. Similarly, data will be transmitted by transmitter 186' on device 200 on side 180 of lane 198, which now acts as the ingress side of the lane, indicated by arrow 189 (shown in phantom) to receiver 158 of transceiver pair 152. The result is that switching circuit 185 of system 150 has effectively reversed the ingress and egress sides of lane 198 to provide connectivity to device 200 that has different orientation of its transmitters and receivers. Because lane reversal switching system 150 is on a single chip, e.g., chip 250, and eliminates the nodes on the sides of the lanes as found in the prior art, system 150 provides both DC and high frequency AC impedance matching.

The DC impedance is matched because the DC impedance of the terminating resistance of the active transmitter matches the terminating resistance of the utilized receiver. For example, terminating resistance 164, e.g., 50Ω, associated with active transmitter 156, matches terminating resistance 216, e.g., 50Ω, associated with active receiver 184 on device 200. Similarly, terminating resistance 188 associated with active transmitter 186 matches terminating resistance 176 associated with active receiver 168. The same DC impedance matching is found when transmitter 170 is active and receiver 184' is used and when transmitter 186' is enabled and receiver 158 is used.

The high frequency AC impedance associated with the terminating resistance of the active transmitter is matched with the characteristic impedance associated with the various package traces 165 and 208, card traces 206 and 210, and package traces 202 and 214 that behave like transmission lines with a characteristic impedance, as well as backplane transmission lines 204 and 212.

For example, if transmitter 156 of transceiver pair 152 is enabled and terminating resistance 164 is, e.g., 50Ω, and package trace 165 behaves like a transmission line with a characteristic impedance, e.g., 50Ω, the signal traveling from transmitter 156 to package trace 165 will meet a matched high frequency impedance and no reflection will occur. When the signal travels across card trace 206, backplane transmission line 204, and package trace 202, all of which behave like a transmission line with a characteristic impedance, e.g., 50Ω, no reflection will occur. When the signal meets terminating resistance 216, e.g., 50Ω, associated with active receiver 184, no reflection will result and the signal that is received by receiver 184 is a full strength signal. Similarly, when transmitter 186 is active and receiver 168 is used, no reflection will occur. The same result is also found when transmitter 170 is enabled and receiver 158 is used. Because receiver 158 of transceiver pair 152 is associated with terminating resistance 164, e.g., 50Ω, and receiver 168 of transceiver pair 154 is associated with terminating resistance 176, e.g., 50Ω, no reflection will occur at active receiver 158 or 168. The result is that high frequency reflections are virtually eliminated as is the pulse edge distortion associated therewith.

Switching circuit 185 is responsive to an external control signal from external pin 191 by line 192 that selectively switches switching device 194 and switching device 196 to nodes 197 and 199, respectively, to enable transmitter 156 of transceiver pair 152 and utilize receiver 168 of transceiver pair 154. In this example, the control signal on line 192 may be a logical high (e.g. CTL=1) that enables transmitter 156. The control signal on line 192 also switches switching device 194 and switching device 196 to nodes 201 and 203, respectively, to enable transmitter 170 of transceiver pair 154 and to utilize receiver 158 of transceiver pair 152. In this example, the externally generated control signal on line 192 may be a logic low (e.g., CTL=0). The output of inverter 195 is connected to transmitter 170 which enables transmitter 170 when CTL=0 (CTL=1).

Figure 7:
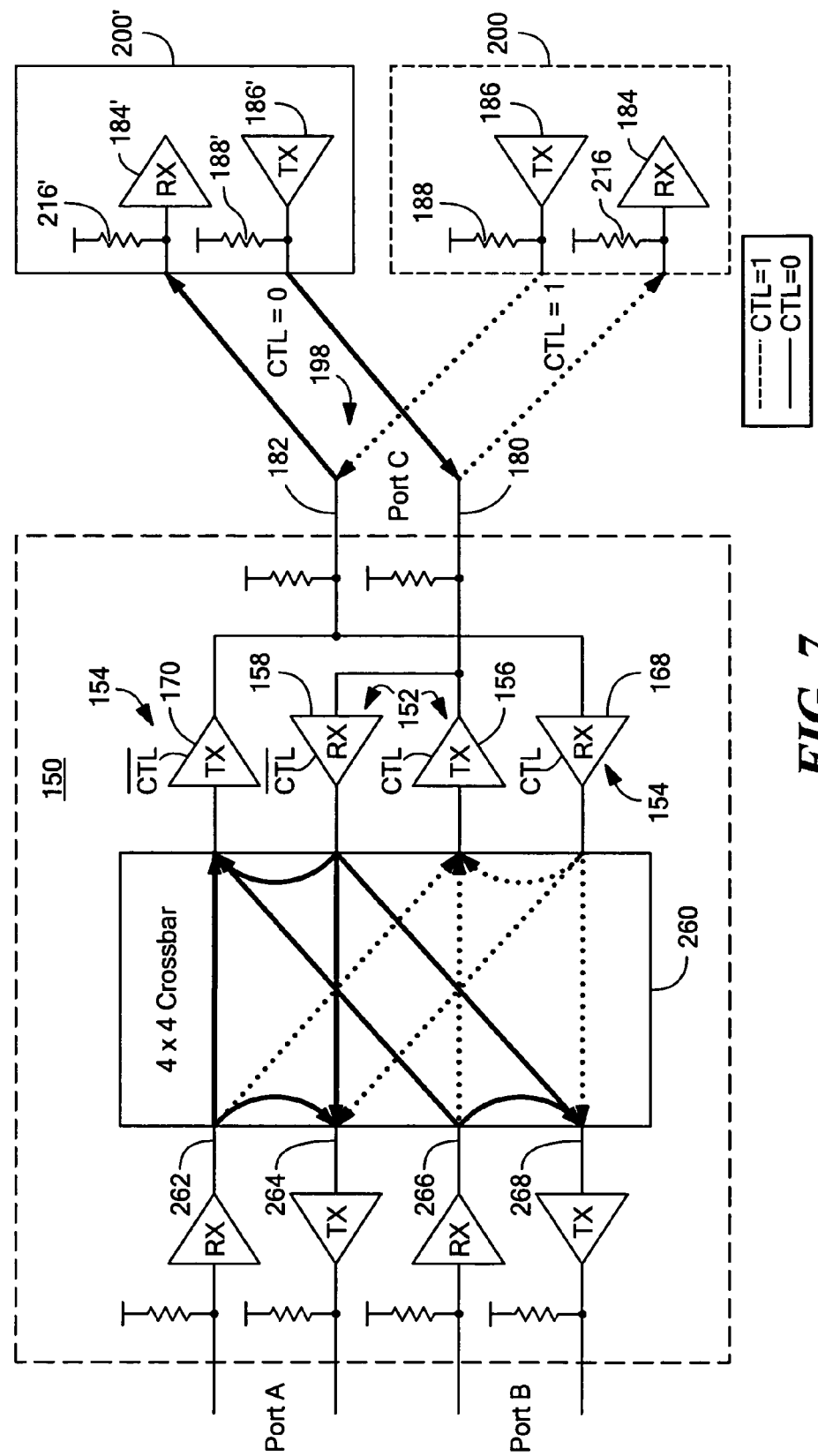
FIG. 7 is schematic block diagram of another embodiment of the impedance matched lane reversal switching system of this invention.

Switching circuit 185 also includes cross bar circuit 260, FIG. 7, having at least one input and at least one output, e.g., receiver output 262 and transmitter input 264. Cross bar circuit 260 selectively connects receiver output 262 to one of the transmitters of transceiver pairs 152 and 154 and connects transmitter input 264 to one of the receivers of the other of transceiver pairs 152 and 154. For example, cross bar circuit 260 may connect receiver output 262 to transmitter 170 of transceiver pair 154 and transmitter input 264 to receiver 158 of transceiver pair 152, e.g., when the control signal is low (CTL=0). Cross bar circuit 260 may also connect receive output 262 to transmitter 156 of transceiver pair 152 and transmitter input 264 to receiver 168 of transceiver pair 154, e.g., when the control signal is high (CTL=1). Similarly, cross bar circuit 260 may also connect receiver output 266 and transmitter input 268 to transmitter 170 and receiver 158, respectively, as well as to transmitter 156 and receiver 168.

As described above, system 150 effectively reverses sides 180 and 182 of lane 198 to provide connectivity to a device, e.g., a line card or switch card that has opposite orientation of its transmitters and receivers, such as devices 200 and 200'.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An impedance matched lane reversal switching system comprising:
   a first transceiver comprising a first transmitter and a first receiver, an output of the first transmitter being connected to an input of the first receiver and to a first transmission line, the first transceiver disposed at a near end of a lane comprising the first transmission line and a second transmission line;
   a first terminating resistance comprising a first node connected to the output of the first transmitter, to the input of the first receiver, and the first transmission line;
   a second transceiver comprising a second transmitter and a second receiver, an output of the second transmitter being connected to an input of the second receiver and to the second transmission line, the second transceiver disposed at the near end of the lane;
   a second terminating resistance comprising a second node connected to the output of the second transmitter, to the input of the second receiver, and the second transmission line; and
   a switching circuit for selectively enabling one of a first configuration comprising enabling the first transmitter, utilizing the second receiver, disabling the second transmitter, and not utilizing the first receiver and a second configuration comprising enabling the second transmitter, utilizing the first receiver, disabling the first transmitter, and not utilizing the second receiver, thereby selectively reversing an egress side and an ingress side of the near end of the lane while maintaining impedance matching between the first transceiver and the near end of the lane and between the second transceiver and the near end of the lane.

2. The system of claim 1 further including a connection at a far end of the lane to at least two types of devices that have different orientations of their transmitters and receivers.

3. The system of claim 2 in which said at least two types of devices include line cards.

4. The system of claim 2 in which said at least two types of devices include switch cards.

5. The system of claim 1 in which said system is integrated on a single chip.

6. The system of claim 5 in which said single chip is disposed on a switch card.

7. The system of claim 5 in which said single chip is disposed on a line card.

8. The system of claim 1 in which said switching circuit includes a plurality of switching devices for selectively enabling one of the first configuration and the second configuration in response to an external control signal.

9. The system of claim 8 in which said switching circuit includes an external control pin.

10. The system of claim 1, in which the switching circuit further comprises a cross bar circuit having at least one input and at least one output, the cross bar circuit selectively connecting said at least one output to an enabled one of said first transmitters or second transmitter and selectively connecting said at least one input to a utilized one of the first receivers or second receiver.

11. An impedance matched lane reversal switching system comprising:
   first and second transceivers disposed at a near end of a lane comprising first and second transmission lines, each transceiver including a transmitter, a receiver, and a node, the output of the transmitter connected to the input of the receiver and to the node, the nodes of the first and second transceivers connected to the first and second transmission lines, respectively;
   first and second terminating resistances connected to the nodes of the first and second transceivers, respectively; and
   a switching circuit for selectively enabling one of the transmitters of said first and second transceivers and disabling the other in one mode to selectively reverse an egress side and an ingress side of the near side of the lane while maintaining impedance matching between the first transceiver and the near end of the lane and between the second transceiver and the near end of the lane.

12. A method of impedance matching and lane reversing a switching system comprising the steps of:
   providing a first transceiver comprising a first transmitter and a first receiver, an output of the first transmitter being connected to an input of the first receiver, to a first terminating resistance, and to a first transmission line, the first transceiver disposed at a near end of a lane comprising the first transmission line and a second transmission line;
   providing a second transceiver comprising a second transmitter and a second receiver, an output of the second transmitter being connected to an input of the second receiver, to a second terminating resistance, and to the second transmission line, the second transceiver disposed at the near end of the lane; and
   selectively enabling one of a first configuration comprising enabling the first transmitter, utilizing the second receiver, disabling the second transmitter, and not utilizing the first receiver and a second configuration comprising enabling the second transmitter, utilizing the first receiver, disabling the first transmitter, and not utilizing the second receiver thereby selectively reversing an egress side and an ingress side of the near side of the lane while maintaining impedance matching between the first transceiver and the near end of the lane and between the second transceiver and the near end of the lane.

13. The system of claim 1 in which the switching circuit receives an input signal, the input signal being connected to the first transmitter in the first configuration and connected to the second transmitter in the second configuration.

14. The system of claim 1 in which the switching circuit comprises an output signal, the output signal being connected to the second receiver in the first configuration and connected to the first receiver in the second configuration.

15. The system of claim 11 in which said system is integrated on a single chip.

16. The system of claim 11 in which the switching circuit further includes a cross bar circuit having at least one input and at least one output, the cross bar circuit selectively connecting said at least one output to an enabled one of said transmitters of the first and second transceivers and selectively connecting said at least one input to a utilized one of the receivers of the first and second transceivers.

17. The method of claim 12, wherein the first and second transmitters, first and second receivers, and first and second terminating resistances are disposed on a single chip.

18. The method of claim 12 further including selectively connecting an output to an enabled one of said first transmitter or second transmitter and selectively connecting an input to a utilized one of the first receiver or second receiver.

* * * * *